United States Patent [19]
Kawate et al.

[11] Patent Number: 6,051,652
[45] Date of Patent: Apr. 18, 2000

[54] REACTIVE HOT MELT COMPOSITION, COMPOSITION FOR PREPARATION OF REACTIVE HOT MELT COMPOSITION, AND FILM-FORM HOT MELT ADHESIVE

[75] Inventors: Kohichiro Kawate, Machida; Shigeyoshi Ishii, Sagamihara, both of Japan

[73] Assignee: 3M Innovative Properties Company, St. Paul, Minn.

[21] Appl. No.: 09/068,073
[22] PCT Filed: Oct. 23, 1996
[86] PCT No.: PCT/US96/16924
  § 371 Date: Apr. 30, 1998
  § 102(e) Date: Apr. 30, 1998
[87] PCT Pub. No.: WO97/16500
  PCT Pub. Date: May 9, 1997

[30] Foreign Application Priority Data

Oct. 31, 1995 [JP] Japan .................................. 7-283142

[51] Int. Cl.$^7$ .................................................. C08K 5/04
[52] U.S. Cl. ...................... 525/119; 525/107; 522/120; 522/134; 522/135; 522/143; 522/102
[58] Field of Search ...................... 522/120, 112, 522/102, 100, 134, 135, 143, 149, 162; 525/119, 107

[56] References Cited

U.S. PATENT DOCUMENTS

| | | | |
|---|---|---|---|
| 4,996,132 | 2/1991 | Tazawa et al. | 430/286 |
| 5,339,604 | 8/1994 | Sano et al. | 524/356 |
| 5,418,288 | 5/1995 | Kawasaki et al. | 525/71 |

FOREIGN PATENT DOCUMENTS

| | | |
|---|---|---|
| 63-230781 | 9/1988 | Japan . |
| 3-239957 | 9/1991 | Japan . |
| 5-320608 | 12/1993 | Japan . |
| 6-158017 | 6/1994 | Japan . |
| 6-172731 | 6/1994 | Japan . |
| 6-306346 | 11/1994 | Japan . |

*Primary Examiner*—James J. Seidleck
*Assistant Examiner*—Sanza McClendon
*Attorney, Agent, or Firm*—John A. Fortkort; Steven E. Skolnick

[57] ABSTRACT

A composition for preparing a reactive hot melt composition comprises (a) a thermoplastic polymer which comprises a polyolefin having an epoxy group, and (b) a radiation polymerizable component containing (b-1) an aliphatic alkyl (meth)acrylate and (b-2) an acrylic compound having a functional group reactive with an epoxy group. A reactive hot melt composition is obtained by polymerizing this composition so as to polymerize the radiation polymerizable component.

The reactive hot melt composition which can be easily hot melt coated, crosslinked quickly in the absence of radiation or moisture after bonding adherends, does not form moisture during crosslinking, and has high flowability during hot melting.

5 Claims, 3 Drawing Sheets

REACTIVE HOT MELT COMPOSITION, COMPOSITION FOR PREPARATION OF REACTIVE HOT MELT COMPOSITION, AND FILM-FORM HOT MELT ADHESIVE

BACKGROUND OF THE INVENTION

1. Field of the Invention

The present invention relates to a composition suitable for preparing a reactive hot melt composition, and the reactive hot melt composition made therefrom. Advantageously, the reactive hot melt composition can be used as a hot melt adhesive, in particular, a film-form adhesive having a determined thickness. The hot melt adhesive is useful for adhering electronic parts such as integrated circuit (IC) chips to a substrate as well as for producing multilayer electronic interconnect circuits. Suitable substrates include ceramics, metals, plastics, and the like, and the reactive hot melt compositions of the present invention have good adhesion to these surfaces.

2. Description of the Related Art

A hot melt adhesive gives high speed adhesion because adhesion is obtained through a physical change in the adhesive. A thermoplastic resin composition that is solid at room temperature is melted, applied to an adherend, and then cooled until it solidifies. By utilizing this property, manufacturing productivity can be increased. Hot melt adhesives have been mainly used in packaging and woodworking applications, with wide use in the electric and electronic fields more recently.

However, conventional hot melt adhesives have poor adhesion at temperatures above their melting points and low heat resistance, which limits the use of the hot melt adhesives in the electric and electronic applications. For example, adhesives used for fixing a lead pin to a lead frame of an IC chip are heat laminated and then placed in a high temperature environment of 230 to 260° C., which is higher than the temperature for soldering. Since conventional hot melt adhesives cannot maintain sufficient adhesion at these temperatures, they cannot be used in these applications.

Reactive hot melt adhesives, which crosslink after bonding, are known for having improved heat resistance. Examples of known reactive hot melt adhesives include the following:

(1) A moisture-curing hot melt adhesive comprising a polymer which has an isocyanate group (see U.S. Pat. No. 5,418,288 corresponding to JP-A-6-158017, etc.);

(2) A silanol condensation type hot melt adhesive comprising a polymer which has a silyl group (see JP-A-5-320608, etc.);

(3) A radical polymerization type hot melt adhesive comprising a polymer which has an acryloyl group (see JP-A-63230781, etc.);

(4) A thermosetting hot melt adhesive comprising a polymer which has a glycidyl group, and a phenol resin (see JP-A-6172731, etc.); and (5) A method for crosslinking a hot melt adhesive by irradiation after application of the adhesive (see JP-A-6-306346, etc.).

However, the reactive hot melt adhesives disclosed in these references still have the following drawbacks:

(i) In general, the crosslinking reaction is slow, and a lengthy post curing is necessary (for example, in the case of (1) and (2) above);

(ii) Some of the adhesives require moisture (usually obtained from the air) for the crosslinking reaction, and are not suitable for use in environments where the adhesive has limited exposure to air during curing (for example, in the case of (1) above);

(iii) Some of the adhesives generate water as a by-product, which may have adverse effects, such as the deterioration of adhesion with time, particularly for bonding electronic parts. (for example, in the case of (2) above);

(iv) Some of the adhesives require a solvent for forming a film adhesive, and the residual solvent may have adverse effects (for example, in the case of (1) to (4) above);

(v) In general, the crosslinking reaction proceeds gradually even when the adhesives are stored at room temperature (about 25° C.), and the adhesives have poor shelf stability (for example, in the case of (1), (2) and (3) above); and (vi) A radiation crosslinking adhesive is not suitable for use with adherends that do not readily permit or tolerate radiation exposure (in the case of (5) above).

It would be desirable to have a composition that can yield a reactive hot melt adhesive that does not suffer from these drawbacks, as well as the resulting reactive hot melt composition, especially if it can be provided in film form.

SUMMARY OF THE INVENTION

The present invention provides a reactive hot melt composition comprising: (a) a thermoplastic polymer which comprises a polyolefin having an epoxy group; and (b) a copolymer which is obtained by radiation polymerizing an aliphatic alkyl (meth)acrylate, and an acrylic compound having a functional group reactive with an epoxy group. (Herein, "(meth)acrylate" collectively means an acrylate and/or a methacrylate.)

The reactive hot melt composition (hereinafter sometimes referred to as the "hot melt composition") is a solid at room temperature (about 25° C.) (hereinafter "room temperature" means "about 25° C."). It melts at a relatively low temperature in comparison with conventional hot melt adhesives (for example, at 120° C. or lower), can be easily hot melt coated, and is quickly crosslinked by heat after it has been applied to an adherend, and without requiring radiation or moisture. Accordingly, it can be advantageously used as a heat crosslinking type hot melt adhesive. In this case, the above described problems associated with radiation crosslinking and moisture curing hot melt adhesives can be avoided.

Since the crosslinking reaction is substantially a reaction between the "epoxy group" of the epoxy-functional polyolefin thermoplastic, and the "functional group reactive with an epoxy group" in the radiation-induced copolymer, no reaction by-product such as water is generated. The hot melt composition has relatively high flowability in the hot melt state, and requires no solvent for shaping it into a film. Further, the composition has excellent shelf stability, since a crystalline phase consisting of the thermoplastic polymer and an amorphous phase consisting of the radiation-induced copolymer form a phase separated structure. On the other hand, post curing proceeds relatively quickly. The thermoplastic polymer and the radiation-induced copolymer are mixed with each other and crosslinking proceeds quickly when the composition is heated to a temperature above the melting temperature of the crystalline phase.

When observed with a polarized light microscope (magnification of 100 to 400 times in general) the "crystalline phase" and the "amorphous phase" are separated before heating, but they are molten and the crystalline phase disappears partially or completely when the composition is heated to a temperature above than the melting point of the thermoplastic polymer. The size of the crystalline phase domains is usually from 0.1 to 100 µm. The presence and subsequent melting of the crystalline phase in the composition are confirmed by measuring the heat of fusion by differential scanning calorimetry (DSC).

The hot melt compositions of the present invention can be readily prepared from a composition comprising (a) a thermoplastic polymer which comprises a polyolefin having an epoxy group, and (b) a radiation polymerizable component containing (b-1) an aliphatic alkyl (meth)acrylate and (b-2) an acrylic compound having a functional group reactive with the epoxy group. The hot melt composition is prepared by irradiating the composition with, for example, UV light or an electron beam so as to substantially polymerize only the radiation polymerizable components and to solidify the composition. The above-described phase separated structure is readily formed as result of this.

A film-form hot melt adhesive with a determined thickness comprising the hot melt composition of the present invention is one advantageous application, and solves the above-described drawbacks of conventional reactive hot melt adhesives. The film-form hot melt adhesive can be placed between a pair of adherends which are easily heat laminated at the desired temperature. Excellent adhesion can be obtained by post-curing at a specific temperature for a specific time.

BRIEF DESCRIPTION OF THE DRAWINGS

The invention will be more fully appreciated with reference to the following drawings in which.

DETAILED DESCRIPTION OF THE PREFERRED EMBODIMENTS

Figure 1:
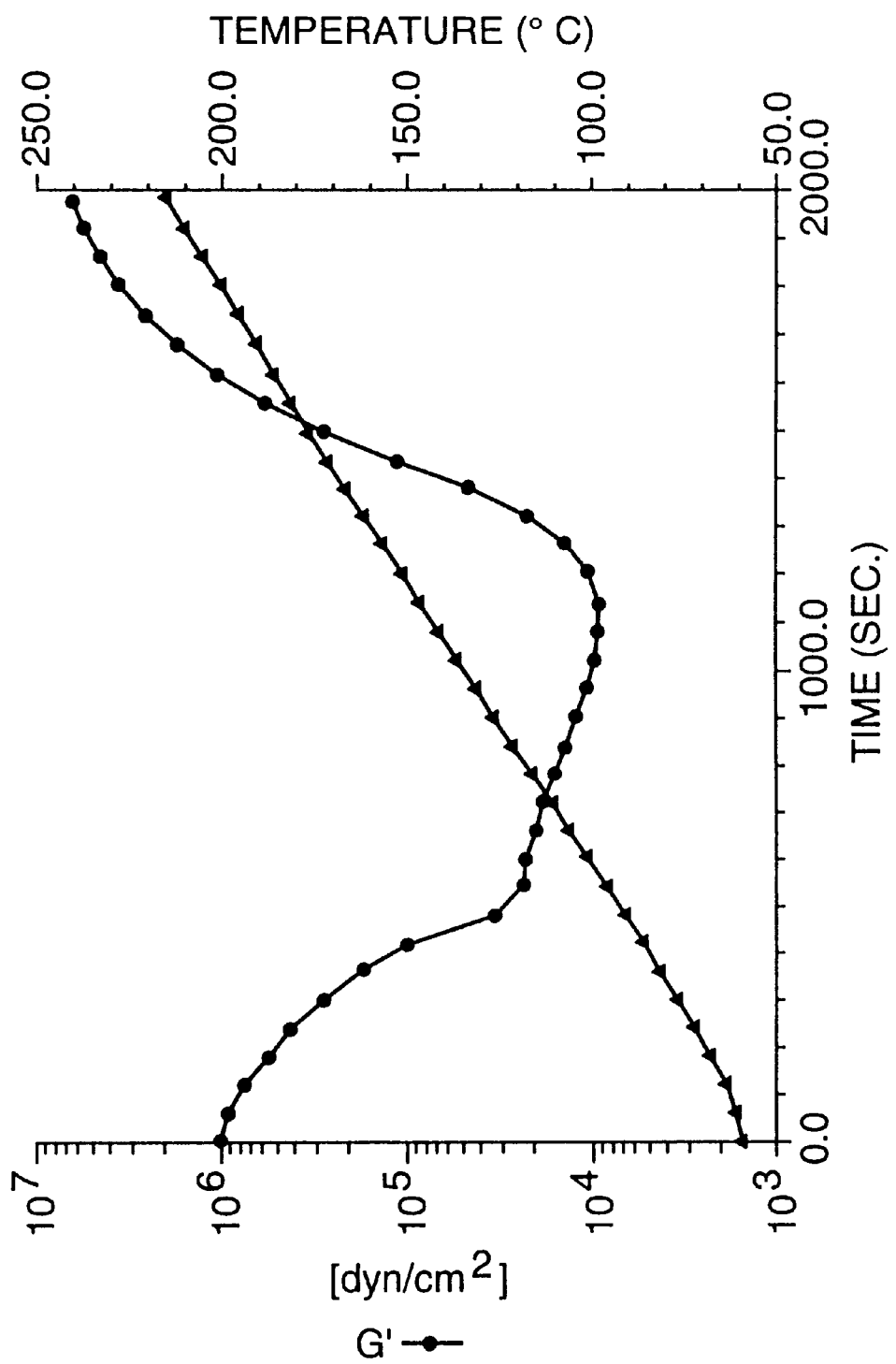
FIG. 1 is a graph showing the temperature change of the shear modulus G' obtained in Example 13.

The "thermoplastic polymer comprising a polyolefin having an epoxy group" (hereinafter sometimes referred to as the "thermoplastic polymer") enables the hot melt composition of the invention to melt at a relatively low temperature, for example, 120° C. or lower. This makes hot melt coating of the composition easy, imparts good heat bonding properties (i.e., adhesion to the adherend after cooling and solidifying the composition), and improves the cohesive strength of the composition through a crosslinking reaction with the radiation-induced copolymer upon heating of the hot melt composition. The excellent cohesive strength advantageously improves the peel adhesion (peel strength) of the hot melt composition.

The "thermoplastic polymer comprising a polyolefin having an epoxy group" means a copolymer derived from a monomer mixture containing (i) a monomer having an epoxy group and (ii) an olefinic monomer. Specific examples of the epoxy-functional monomer (i) are (meth)acrylates having an epoxy group such as glycidyl (meth)acrylate. Specific examples of the olefinic monomer (ii) are ethylene and propylene. Monomers other than (i) and (ii), such as alkyl (meth)acrylates, vinyl acetate, and the like, may also be used. Specific examples of the thermoplastic polymer are a copolymer of glycidyl (meth)acrylate and ethylene; a terpolymer of glycidyl (meth)acrylate, vinyl acetate and ethylene; and a terpolymer of glycidyl (meth) acrylate, ethylene and an alkyl (meth)acrylate. Blends of different thermoplastic polymers can also be used.

In a particularly preferred embodiment, the thermoplastic polymer contains at least 50 wt. % preferably at least 75 wt. %, of repeating units comprising glycidyl (meth)acrylate and ethylene, based on the weight of the thermoplastic polymer. A repeating unit weight ratio of glycidyl (meth) acrylate (A) and ethylene (E) (A:E) is preferably from 60:40 to 1:99, more preferably from 30:70 to 5:95. A copolymer of glycidyl (meth)acrylate and ethylene facilitates hot melt coating of the composition, improves the heat adhesion, and enhances the crosslinking reaction with the radiation-induced copolymer.

The melt flow rate ("MFR") of the thermoplastic polymer, measured at 190° C. according to JIS K 6760, is preferably in the range of 10 and 1000 g/10 min. When the MFR is less than 10 g/10 min., mixing of the thermoplastic polymer with other components of the hot melt composition tends to be difficult. When the MFR is greater than 1000 g/10 min., the cohesive force of the hot melt composition may deteriorate. The weight average molecular weight of the thermoplastic polymer is selected so that the MFR is in this range, and is usually 200,000 or less.

The thermoplastic polymer preferably provides from 20 to 95 wt. % of the hot melt composition (or the composition for which this is prepared). When the content is less than 20 wt. %, the heat adhesion property of the composition tends to deteriorate. When it exceeds 95 wt. %, the viscosity of the composition increases and it may be more difficult to handle.

The "radiation-induced copolymer" is a copolymer prepared from radiation polymerizable components containing, as essential ingredients, the "aliphatic alkyl (meth)acrylate", and the "acrylic compound having a functional group reactive with an epoxy group." The radiation-induced copolymer forms an amorphous phase which is phase separated from the crystalline phase provided by the thermoplastic polymer, and improves the shelf stability of the composition. When the hot melt composition is heated to temperature above the melting point of the thermoplastic polymer, the thermoplastic polymer and the radiation-induced copolymer become partially mixed to cause the crosslinking reaction.

Preferably, the radiation-induced copolymer is prepared by irradiating a precursor composition comprising the thermoplastic polymer and the radiation polymerizable components, that is, the composition for the preparation of the hot melt composition, so as to polymerize the radiation polymerizable components. Thereby, the above described phase separated structure is stably formed, and the shelf stability of the composition is further improved.

The crosslinking reaction of the radiation-induced copolymer and the thermoplastic polymer starts at a temperature in the range between 120° C. and 180° C., and is completed in a time period of from several minutes to several hours. However, since the reaction time is relatively long at a temperature around 120° C. (a temperature at which hot melt coating is possible), the crosslinking is preferably performed at a temperature of 140° C. or higher. That is, hot melt coating can be carried out in a relatively short time at a temperature of about 120° C. or lower, while the crosslinking reaction is performed at a temperature of 140° C. or higher. This avoids a decrease in coatability due to the progress of the crosslinking reaction, while still allowing the bonding to proceed quickly.

The radiation polyinerizable components which are the starting materials of the radiation-induced polymer may contain other radiation polymerizable compounds in such amounts that the performance of the present invention is not substantially impaired.

The "aliphatic alkyl (meth)acrylate" (hereinafter sometimes referred to as "aliphatic acrylate") is an essential starting material of the radiation-induced copolymer together with the "acrylic compound having a functional group reactive with an epoxy group." In the hot melt composition, the aliphatic acrylate improves the compatibility of the radiation-induced copolymer with the thermoplastic polymer when the composition is melted. Further, in preparing the composition for the preparation of the hot melt composition, the aliphatic acrylate functions as a reactive diluent to dissolve the thermoplastic polymer, decreases the viscosity of the composition to facilitate handling of the composition, and is polymerized with the other radiation polymerizable component to form the solid hot melt composition.

Herein, the "aliphatic alkyl group" in the "aliphatic alkyl (meth)acrylate" may be selected from (i) an acyclic alkyl group such as methyl, ethyl, propyl, and the like, and (ii) an alicyclic alkyl group such as isobornyl, cyclohexyl, dicyclopentanyl, and the like. Preferably, the aliphatic alkyl (meth)acrylate is an aliphatic acrylate having an alicyclic alkyl group, since this increases the glass transition temperature of the hot melt composition, and improves the strength, heat resistance and adhesion properties of the composition. Preferred examples of the aliphatic alkyl (meth)acrylate are isobornyl (meth)acrylate, cyclohexyl (meth)acrylate, and dicyclopentanyl (meth)acrylate.

The aliphatic acrylate preferably provides from 4 to 79 wt. % of the composition for preparing the hot melt composition. When the content is less than 4 wt. %, the viscosity of the composition for preparing the hot melt composition tends to increase; when it exceeds 79 wt. %, the heat adhesion property of the hot melt composition tends to decrease.

The "acrylic compound having a functional group reactive with an epoxy group" (hereinafter sometimes referred to as "acrylic compound") is an essential starting material of the radiation-induced polymer together with the aliphatic acrylate, and functions to enable the crosslinking reaction of the radiation-induced copolymer and the thermoplastic polymer.

Herein, the "functional group reactive with an epoxy group" means a functional group having an active hydrogen which ring-opens the epoxy group, such as a carboxyl group, a hydroxyl group, an amino group, and the like. The carboxyl group is preferable in view of the balance between high reactivity and shelf stability. The "acrylic compound" means a monomer or oligomer having a (meth)acryloyl group. Among them, the monomer is preferable since it decreases the viscosity of the composition for the preparation of the hot melt composition, and makes it easy to handle.

Preferred examples of the acrylic compound are (meth) acrylic acid, hydroxyhexanoic (meth)acrylate, ethylene oxide-modified phthalic (meth)acrylate, ethylene oxide-modified malonic (meth)acrylate, ethylene oxide-modified glutaric (meth)acrylate, and ethylene oxide-modified adipic (meth)acrylate.

The acrylic compound preferably provides 1 to 30 wt. % of the composition for the preparation of the hot melt composition. When the content is less than 1 wt., % the polymers may not be crosslinked; when it exceeds 30 wt. %, a homogeneous mixture may not be obtained when the composition for the preparation of the hot melt composition is prepared.

The hot melt composition of the present invention may contain thermoplastic resins other than the above-described thermoplastic polymer so long as the performance of the hot melt composition is not substantially impaired. The additional thermoplastic resin may function as a tackifier to reduce the modulus of the composition during heat lamination of the composition, and to further increase the heat adhesion property. Accordingly, when the hot melt composition of the present invention is used as the adhesive, the use of additional thermoplastic resin is preferable. Specific examples of the additional thermoplastic resin are rosin resin, terpene-phenol resin, terpene resin, aromatic hydrocarbon-modified terpene resin, petroleum resin, chromanindene resin, styrene resin, phenol resin, xylene resin, polyolefin resin, and the like.

The additional thermoplastic resin preferably provides from 1 to 30 wt. % based on the total weight of the components contained in the composition for the preparation of the hot melt composition. When this content is less than 1 wt. %, the heat adhesion property of the hot melt composition may not be improved; when it exceeds 30 wt. %, the cohesive strength and heat resistance of the hot melt composition tends to deteriorate.

A crosslinking agent which reacts with the epoxy group of the thermoplastic polymer can be added to increase the crosslinking density, as long as the performance of the hot melt composition is not substantially impaired. Specific examples of useful crosslinking agent are amines, carboxylic acids, acid anhydrides, polyamide resins, dicyandiamide hardening agents (including dicyandiamide and its derivatives), organic acid hydrazides, imidazole derivatives, diaminomaleonitrile and its derivatives, and melamine and its derivatives. In particular, a fluoreneamine or imidazole derivative of the following formula:

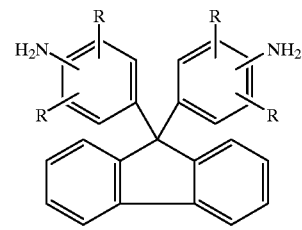

wherein each R is independently hydrogen, chlorine or an alkyl group such as methyl, ethyl, propyl, etc. is suitable since it has excellent latency.

In addition, the composition for the preparation of the hot melt composition may contain a radical photopolymerization initiator or cationic photopolymerization initiator to accelerate the radiation induced polymerization. In particular, when the radiation is UV light, the addition of a radical photopolymerization initiator is useful. A suitable radical photopolymerization initiator is of the cleavage type, and specific examples are DAROCURE D 1173 and IRGACURE-651, both available from Ciba-Geigy. Further, an additive such as an antioxidant, a UV light absorber, a filler, a lubricant, a rubber component, and the like may be added to the compositions of the invention. As a filler, electrically conductive particles may be added.

The hot melt composition of the present invention may be prepared as follows:

A mixture of the thermoplastic polymer, the radiation-induced copolymer, and other optional components such as a tackifier, a radical polymerization initiator, and other additives is kneaded at a certain temperature to obtain the precursor composition, that is, the composition for the preparation of the hot melt composition.

The order in which the components are added is not critical. Preferably, however, components which accelerate chemical reactions such as the polymerization or crosslinking of the components (e.g., the radical polymerization initiator) are added last. The mixture is kneaded at a temperature at which the epoxy group of the thermoplastic polymer and the functional group reactive with the epoxy group of the acrylic compound do not substantially react each other, usually from 80 to 140° C. using apparatus such as a kneader, an extruder, a planetary mixer, a homogenizer, or the like. The resulting composition for the preparation of the hot melt composition is, in general, a homogeneous liquid composition.

Subsequently, the resulting composition is irradiated to substantially polymerize only the radiation polymerizable components, and without causing any substantial thermal crosslinking between the thermoplastic polymer and the radiation-induced copolymer, so as to prepare the reactive hot melt composition of the present invention. Where the radiation is provided by an electron beam, the thermoplastic polymer can be partially crosslinked to increase the cohesive strength of the composition so long as the hot melt property of the composition is not substantially deteriorated. In the hot melt composition, the phase separated structure consisting of the crystalline phase provided by the thermoplastic polymer, and the amorphous phase provided by the radiation-induced copolymer is formed.

UV light, electron beam, X-ray, visible light and the like can all be used as the radiation source. The irradiation intensity is selected so that only the radiation polymerizable components are substantially polymerized, but the epoxy group on the thermoplastic polymer and the functional group reactive with the epoxy group of the radiation-induced copolymer do not react due to generated heat, at this stage. For instance, in the case of the UV light irradiation, the irradiation time is from several second to several thousand seconds.

A film-form hot melt adhesive comprising the hot melt composition of the present invention and having a specific thickness can be readily formed. The composition for the preparation of the hot melt composition, which is liquid at room temperature or can be liquefied by heating, is coated onto a substrate such as a polyethylene terephthalate (PET) film with a knife coater or other coating means to form a precursor layer. The precursor layer is irradiated to form the film. When the adhesive is used as the film-form adhesive, it is removed from the substrate. In this case, preferably the coating surface of the PET film includes a release agent.

Alternatively, the film-form adhesive may be prepared by extruding a precursor layer and irradiating it.

The thickness of the film-form adhesive is not critical and is preferably from 0.001 to 5 mm, more preferably from 0.01 to 0.5 mm. When the film is too thin, handling thereof may be difficult. When it is too thick, the radiation polymerization reaction is nonuniform in the thickness direction, which can cause irregular performance (e.g., strength) and a loss of reliability.

The thus formed film-form hot melt adhesive is advantageously used in adhering an electronic part such as IC chip.

Adherends can be bonded with the film-form hot melt adhesive as follows:

The film-form hot melt adhesive is inserted between a pair of adherends, and heated at a specific temperature for a specific time under a specific pressure. After laminating, the bonded adherends are heated to a temperature sufficient to thermally crosslink the adhesive.

When the adhesive of the present invention is used in the form of a general stick type hot melt adhesive, hot melt coating can be performed by heating the adhesive to a temperature at which no crosslinking reaction proceeds or the viscosity of the molten adhesive does not increase to an extent that coating is inhibited. In such case, the adhesive is coated on one of the adherends, and a second adherend is placed over the first adherend before the adhesive solidifies by cooling. After the adhesive is cooled to a solid, the adherends are heated to thermally crosslink the adhesive.

The adherend may be of any material such as metal, glass, ceramic, plastic, etc.

The hot melt composition of the present invention may also be used as an adhesive tape, when it is fixed as an adhesive layer on a substrate such as a plastic film (e.g. polyamide, polyimide, polyetherimide, polycarbonate, polyethylene, polypropylene, etc.), a fabric, a metal foil, and the like.

Further, the hot melt composition of the present invention may be used as a sealant.

EXAMPLES

The present invention will be explained in more detail by the following examples, which do not limit the scope of the present invention.

Examples 1–17

The components shown in Table 1 were mixed, and then kneaded at about 100° C. to prepare a homogeneous liquid composition for the preparation of the hot melt composition. A homogeneous liquid composition comprising 100 parts by weight of the prepared composition to which 1 part by weight of a radical photopolymerization initiator ("DAROCURE D1173" available from Ciba-Geigy) was added was coated onto a PET film with a knife coater to form a film precursor layer that was 0.2 mm thick. The film precursor layer was irradiated for about 20 seconds using UV light from a high pressure mercury lamp (total irradiation energy of 1000 $MJ/cm^2$) to solidify it to obtain a film-form adhesive consisting of each of the hot melt compositions.

The film-form hot melt adhesive was placed between a copper foil having a width of 1 cm, a length of 4 cm, and a thickness of 30 $\mu$m, and a glass plate having a width of 14 mm, a length of 24 mm and a thickness of 1 mm so that the width and the length of the adhesive part were 10 mm and 5 mm, respectively, followed by heat pressing at 180° C. under 10 $kg/cm^2$ pressure for 10 seconds. The laminate was used as a sample for measurement. The remaining unadhered parts of the copper foil and glass plate were used as clamping margins in the below-described peel adhesion test.

In Examples 1, 2, 3, 6, 12 and 13, a different sample which was produced in the same manner as above was used to thermally bond the copper foil and the glass plate, and then post-cured at 120° C. for 2 hours to obtain a test sample.

The 90 degree peel adhesion of each sample was measured at room temperature at a peeling rate of 50 mm/min. The results are shown in Table 1.

Using each of the film-form adhesives of Examples 1 and 13, the adherends were laminated and then post-cured at 180° C. for 1 hour. Then, in a similar manner to the above method, the hot peel adhesion was measured at 180° C. The hot peel adhesion was 200 g/cm in both Examples 1 and 13.

Measurement of Change of Modulus

With each of the film-form adhesives prepared in Examples 1 to 17, the change in the shear modulus G' between about 60° C. and about 215° C. was measured at a heating rate of 5° C./min. and at a shear rate of 6.28 rad/sec. using the following apparatus:

Apparatus: RDA 11 (a dynamic viscoelasticity measuring apparatus manufactured by RHEOMETRIX) Plate size: 25 mm, Plate gap: 0.7, Parallel plate mode.

The shear moduli measured at 150° C., 180° C. and 190° C. are listed in Table 1, and the temperature change of the shear modulus G' obtained in Example 13 is shown in the graph of FIG. 1. The increase in modulus G' confirmed that the compositions of the Examples according to the present invention were crosslinked by heating them at a temperature higher than 150° C., and the modulus G' increased.

Figure 2:
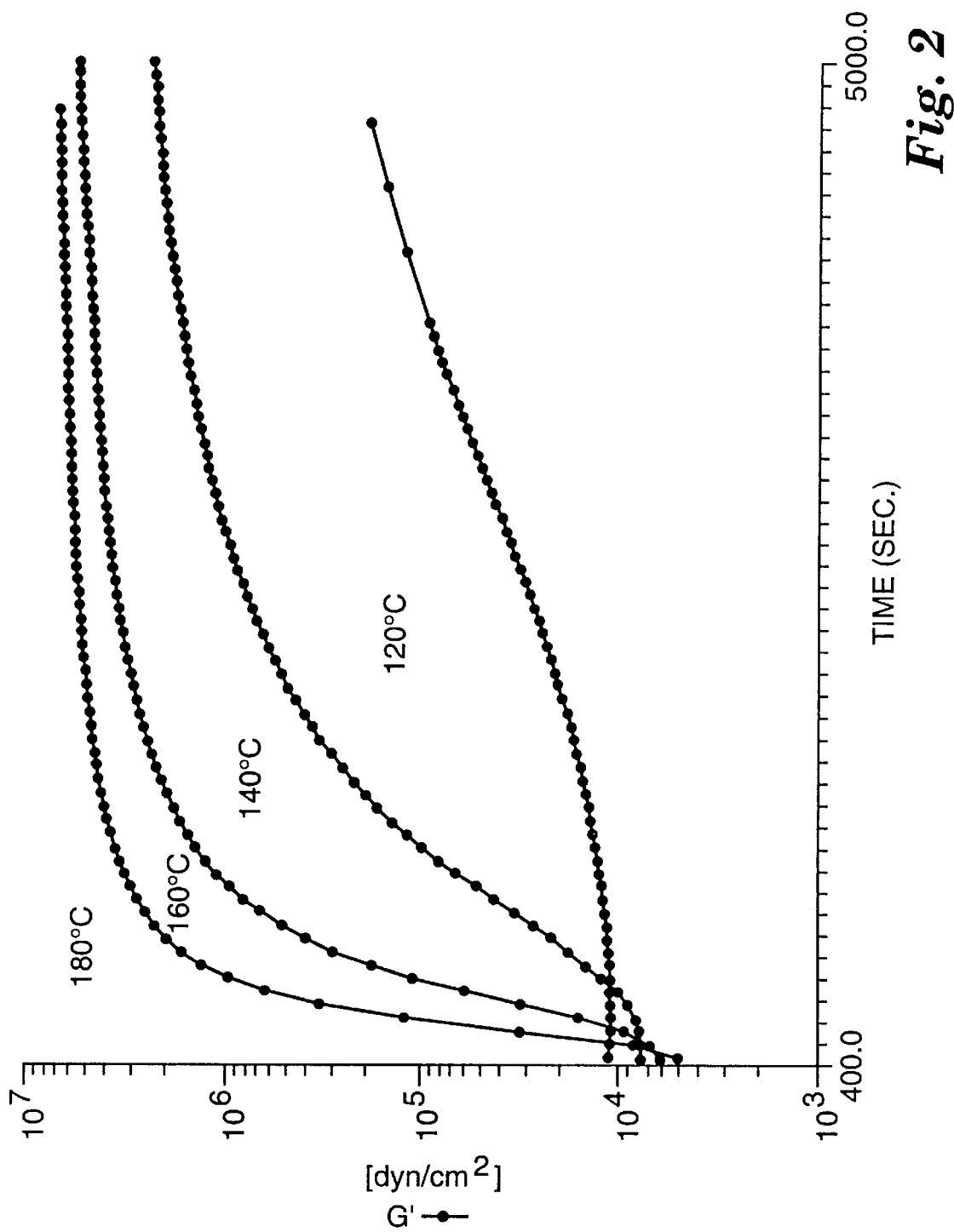
FIG. 2 a graph showing the change of the shear modulus G' with time obtained in Example 13.

The film-form adhesive prepared in Example 13 was heated at 180° C. for 30 seconds, and the change in the shear modulus with time was measured by maintaining the adhesive at a constant temperature of 120° C., 140° C., 160° C. and 180° C. The results are shown in FIG. 2. From these results, it was confirmed that when the adhesive was post-cured at a constant temperature in the above range, the crosslinking reaction proceeded, and the shear modulus G' increased. In particular, the crosslinking rate was high at 160° C.

The film-form adhesives of Examples 1 to 17 were observed under a polarization microscope to confirm the two-phase structure of the crystalline phase provided by the thermoplastic polymer and the amorphous phase provided by of the radiation-induced copolymer. A two phase structure was observed.

Figure 3:
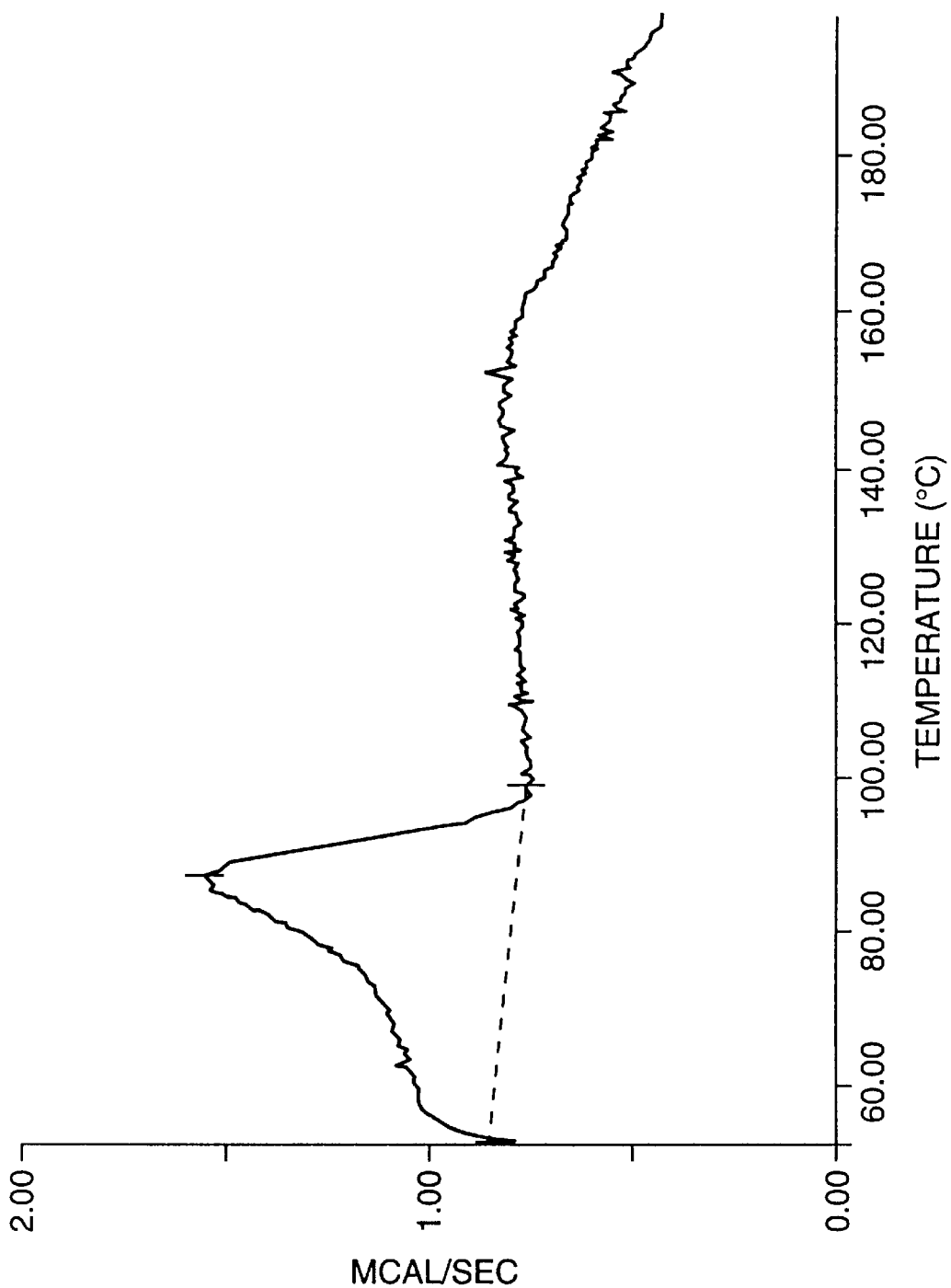
FIG. 3 is a DSC chart of the film-form adhesive of Example 13.

A DSC (differential scanning calorimeter) measurement was carried out on the film-form adhesive of Example 13. The heat of fusion of the crystalline phase of the thermoplastic polymer was observed around 90° C. The result is shown in FIG. 3. From this result, it was confirmed that the crystalline phase was melted by heating it to trigger the crosslinking reaction. The measurement was carried out using a DSC manufactured by Perkin-Elmer at a heating rate of 10° C./min.

In each of the above Examples, the tackifier resins (Components D through D5), the third radiation copolymerizable component (Component E), and the crosslinking agents (Components F and G) for the thermoplastic polymer having the epoxy group were contained mainly in the phase of the radiation-induced copolymer. But, the present invention is not limited to such a phase structure.

Evaluation of Shelf Stability

The shelf stability of the film-form adhesive of Example 13 was evaluated by comparing the shear modulus of the film-form adhesive just after bonding with that after maintaining the bonded adherends at 25° C., 50% RH for 50 days. The shear modulus was measured under the following conditions, and the value measured at 150° C. was used:

Apparatus: RAD 11

Circular frequency: 10 rad/sec.

The shear moduli being measured from 60° C. to 200° C. at a heating mode of 5° C./min.

The shear modulus of the film-form adhesive just after bonding was $1.02 \times 10^4$ dynes/cm$^2$. After 50 days it was $1.04 \times 10^4$ dynes/cm$^2$. The change in the shear modulus was trivial, and did not have any influence on the adhesion properties.

The above shear modulus was a value measured at 150° C. by the same method as above.

The embodiments of the present invention represented by the above Examples, that is, the composition for the preparation of the hot melt composition comprising (a) the glycidyl meth-acrylate-ethylene copolymer (as the thermoplastic polymer), (b-1) isobornyl acrylate (as the aliphatic acrylate), (b-2) the acrylate having the carboxyl group in the molecule (as the acrylic compound) as the essential components, and also other components including the tackifier resin and the radical photopolymerization initiator can be shaped into film form easily without using any solvent. From such composition, the reactive hot melt composition of the present invention can be prepared by irradiation with UV light.

The reactive hot melt composition has excellent adhesion properties (peel adhesion strength) as a thermally crosslinkable adhesive tape. This is due to the excellent crosslinkability, as seen from the increase in the shear modulus after heating. In addition, the reactive hot melt composition has excellent shelf stability.

TABLE 1

| Ex. No. | Components (weight ratio) | Peel strength (kg/cm) | | G' × 10$^{-4}$ (dyn/cm) | | |
|---|---|---|---|---|---|---|
| | | I.A.[1] | P.C[2] | 150° C. | 180° C. | 190° C. |
| 1 | A/B/C/D = 50/30/10/10 | 2.2 | 4.8 | 1.0 | 1.1 | 1.7 |
| 2 | A/B/C/D2 = 50/30/10/10 | 1.1 | 1.9 | 1.2 | 2.0 | 3.4 |
| 3 | A/B/C/D = 50/35/10/5 | 0.8 | 1.7 | 2.4 | 4.7 | 8.1 |
| 4 | A/B/C/D = 50/25/10/15 | 0.4 | | 0.5 | 0.3 | 0.6 |
| 5 | A/B/C/D = 40/40/20/10 | 0.6 | | 0.9 | 0.8 | 1.4 |
| 6 | A/B/C/D = 60/20/20/10 | 0.8 | 3.3 | 0.8 | 0.6 | 1.0 |
| 7 | A/B/C/D = 50/20/20/10 | 1.6 | | 0.3 | 0.2 | 0.3 |
| 8 | A/B/C/D = 50/45/5/10 | 0.3 | | 1.6 | 1.4 | 3.7 |
| 9 | A/B/C/D/E = 50/25/5/10/10 | 0.2 | | 10.9 | 36.2 | 47.3 |
| 10 | A/B/C/D/E/F = 60/25/5/10/5/5 | 0.3 | | 29.5 | 58.5 | 58.9 |
| 11 | A/B/C/D5 = 25/45/5/25 | 0.3 | | 21.4 | 42.2 | 48.6 |
| 12 | A/B/C/D3 = 50/30/10/10 | 0.8 | 4.6 | 0.4 | 28.0 | 92.0 |
| 13 | A/B/C/D4 = 50/30/10/10 | 0.7 | 6.0 | 1.0 | 58.5 | 174.5 |
| 14 | A/B/C/D4 = 60/20/10/10 | 0.7 | | 3.0 | 82.0 | 226 |
| 15 | A/B/C/D4 = 75/10/5/10 | 0.7 | | 1.9 | 204 | 428 |
| 16 | A/B/C = 50/40/10 | 0.2 | | 11.7 | 19.9 | 30.6 |
| 17 | A/B/D/E/G = 50/30/10/10/10 | 10.7 | | 1.0 | 8.3 | 11.3 |

Notes:
[1] Initial adhesion (just after bonding).
[2] After post curing.

Components in Table 1

A: "BOND FAST CG 5001" (a thermoplastic polymer) (a glycidyl methacrylate (G)-ethylene (E) copolymer manufactured by Sumitomo Chemical Co., Ltd. Weight ratio G:E=18:82. MFR=350 g/min. Melting point= about 100° C.).

B: "LIGHTACRYLATE" (an aliphatic alkyl (meth) acrylate) (isobornyl acrylate monomer manufactured by Kyoei Chemical Co., Ltd.)

C: "ARONIX M-5300" (an acrylic compound having a carboxyl group) (6-hydroxyhexanoic acrylate monomer manufactured by Toa Gosei K.K.)

D: "Piccolyte A" (a terpene resin, a tackifier resin) manufactured by Hercules.

D2: "Escorez 1000" (an aliphatic petroleum resin, a tackifier resin) manufactured by Exxon Chemicals.

D3: "POLY-PALE" resin (a polymerized rosin resin, a tackifier resin) manufactured by Hercules.

D4: "DYMEREX" resin (a polymerized rosin resin, a tackifier resin) manufactured by Hercules.

D5: "BONDINE HX8210" (a polyolefin resin, a tackifier resin) (an ethylene-ethyl acrylate-maleic anhydride terpolymer manufactured by Sumitomo Chemical Co., Ltd.).

E: "ACRYESTR-G" (glycidyl methacrylate, a third radiation copolymerizable monomer) manufactured by Mitsubishi Rayon K.K.

F: "2MZ-AZINE" (a crosslinking agent for the thermoplastic resin having the epoxy group) (2,4-diamino-6-[2'-methyl-imidazolyl-(1')]ethyl-s-triazine manufactured by Shikoku Chemical Corp.

G: 9,9'-Bis(3-methyl-4-aminophenyl)fluorene manufactured by 3M (a crosslinking agent for the thermoplastic resin having the epoxy group).

What is claimed is:

1. A solvent-free reactive hot melt composition, comprising:
   (a) a first phase including a thermoplastic polymer which comprises a polyolefin having an epoxy group; and
   (b) a second phase including a copolymer which is obtained by radiation polymerizing an aliphatic alkyl (meth)acrylate and an acrylic compound having a functional group reactive with an epoxy group.

2. The reactive hot melt composition as claimed in claim 1, wherein said functional group reactive with an epoxy group is a carboxyl group.

3. The reactive hot melt composition as claimed in claim 1, which is obtained by irradiating a precursor composition comprising (a) a thermoplastic polymer which comprises a polyolefin having an epoxy group, and (b) a radiation polymerizable component containing (b-1) an aliphatic alkyl (meth)acrylate and (b-2) an acrylic compound having a functional group reactive with an epoxy group, to radiation polymerize said radiation polymerizable component.

4. A solvent free composition for preparation of a phase separated reactive hot melt composition comprising (a) a thermoplastic polymer which comprises a polyolefin having an epoxy group, and (b) a radiation polymerizable component containing (b-1) an aliphatic alkyl (meth)acrylate and (b-2) an acrylic compound having a functional group reactive with an epoxy group.

5. A film-form hot melt adhesive comprising a reactive hot melt composition as claimed in claim 1.

* * * * *